United States Patent
Kojima et al.

(10) Patent No.: US 12,134,567 B2
(45) Date of Patent: Nov. 5, 2024

(54) FERRITE POWDER AND METHOD FOR PRODUCING SAME

(71) Applicant: POWDERTECH CO., LTD., Kashiwa (JP)

(72) Inventors: Takashi Kojima, Kashiwa (JP); Koji Aga, Kashiwa (JP)

(73) Assignee: POWDERTECH CO., LTD., Kashiwa (JP)

( * ) Notice: Subject to any disclaimer, the term of this patent is extended or adjusted under 35 U.S.C. 154(b) by 0 days.

(21) Appl. No.: 17/794,394

(22) PCT Filed: Jan. 22, 2021

(86) PCT No.: PCT/JP2021/002220
§ 371 (c)(1),
(2) Date: Jul. 21, 2022

(87) PCT Pub. No.: WO2021/149794
PCT Pub. Date: Jul. 29, 2021

(65) Prior Publication Data
US 2023/0055795 A1    Feb. 23, 2023

(30) Foreign Application Priority Data
Jan. 24, 2020    (JP) .................................. 2020-009578

(51) Int. Cl.
*C01G 49/00* (2006.01)
*H01F 1/34* (2006.01)
*H01F 1/37* (2006.01)

(52) U.S. Cl.
CPC ......... *C01G 49/0072* (2013.01); *H01F 1/344* (2013.01); *H01F 1/37* (2013.01); *C01P 2004/32* (2013.01); *C01P 2004/61* (2013.01); *C01P 2006/42* (2013.01)

(58) Field of Classification Search
None
See application file for complete search history.

(56) References Cited

U.S. PATENT DOCUMENTS

| | | | |
|---|---|---|---|
| 2007/0245851 A1* | 10/2007 | Sagawa | C22C 33/0278 249/117 |
| 2011/0244389 A1 | 10/2011 | Kojima et al. | |
| 2015/0277256 A1* | 10/2015 | Sawamoto | H01F 1/01 428/402 |
| 2017/0301443 A1* | 10/2017 | Aga | C09D 7/70 |
| 2018/0009677 A1* | 1/2018 | Aga | H01F 1/348 |
| 2018/0179082 A1 | 6/2018 | Aga et al. | |
| 2019/0161362 A1* | 5/2019 | Kojima | C08K 7/18 |
| 2019/0300379 A1 | 10/2019 | Kojima et al. | |
| 2021/0047200 A1 | 2/2021 | Aga et al. | |

FOREIGN PATENT DOCUMENTS

| | | |
|---|---|---|
| JP | 2005015303 A | 1/2005 |
| JP | 2007047341 A | 2/2007 |
| JP | 2011216857 A | 10/2011 |
| JP | 2011227452 A | 10/2011 |
| JP | 2011243776 A | 12/2011 |
| JP | 2016060682 A | 4/2016 |
| JP | 2017178718 A | 10/2017 |
| WO | 2017169316 A1 | 10/2017 |
| WO | 2017212997 A1 | 12/2017 |
| WO | 2019159799 A1 | 2/2019 |
| WO | 2019159797 A1 | 8/2019 |

OTHER PUBLICATIONS

International Search Report for International Application No. PCT/JP2021/002220; Date of Mailing, Mar. 30, 2021.

* cited by examiner

*Primary Examiner* — Ronak C Patel
(74) *Attorney, Agent, or Firm* — CANTOR COLBURN LLP

(57) ABSTRACT

Provided are a ferrite powder that suppresses decreases in saturation magnetization and decreases in filler filling ratio and also suppresses inhibition of resin curing, and a method for producing the same. A ferrite powder composed of spherical ferrite particles, wherein the ferrite powder contains iron (Fe) 54.0-70.0 mass % and manganese (Mn) 3.5-18.5 mass %, has an average volume particle size of 2.0-20.0 μm, and has a carbon content of 0.100 mass % or lower.

8 Claims, No Drawings

FERRITE POWDER AND METHOD FOR PRODUCING SAME

CROSS REFERENCE TO RELATED APPLICATIONS

This is the U.S. national stage of application No. PCT/JP2021/002220, filed on Jan. 22, 2021. Priority under 35 U.S.C. § 119(a) and 35 U.S.C. § 365(b) is claimed from Japanese Application No. 2020-009578, filed on Jan. 24, 2020, the disclosure of which is also incorporated herein by reference.

TECHNICAL FIELD

The present invention relates to a ferrite powder and a method for producing the ferrite powder.

BACKGROUND ART

Ferrite resin composite materials (or ferrite resin compositions) composed of ferrite powder and resins have been widely used in various applications, including electromagnetic shielding materials. Such composite materials are produced by kneading of ferrite powder as fillers with resins and are shaped into various shaped articles (or composite articles) with different shapes such as sheets. In the formation of the shaped articles, the particles, which constitute the ferrite powder, close to a spherical shape have higher flowability in a shaping process and higher filling ratio in the composite articles. Accordingly, such particles contribute to good formability and result in superior characteristics such as electromagnetic shielding properties. From this point of view, ferrite powder composed of spherical particles has been attracted and a process of producing such spherical particles by a thermal spraying process has been proposed.

For example, Patent Document 1 (PCT International Publication No. WO2017/212997) discloses substantially Zn-free monocrystalline ferrite particles having a mean particle size of 1 to 2,000 nm with a highly spherical shape and containing 3 to 25 wt % Mn and 43 to 65 wt % Fe. This patent also discloses that the shaped article composed of such ferrite particles and binder resins exhibits a maximum value of the real part of the complex magnetic permeability (pC) in a frequency band of 100 MHz to 1 GHz, and further discloses that the granular product composed of raw ferrite material is ferritized by a thermal spraying process in the ambient air, followed by rapidly cooling and solidification, that particles within a predetermined range of particle size are then collected and used to produce a shaped article, and that the use of such a shaped article in the electromagnetic shielding material for electronic devices can lead to effective and stable electromagnetic shielding properties, regardless of frequency, in a broad frequency band required for the shielding (see claim 1, and paragraphs [0039] and [0078] in Patent Document 1).

Patent Document 2 (PCT International Publication No. WO2017/169316) discloses Mn-based monocrystalline ferrite particles having a mean particle size of 1 to 2,000 nm with a highly spherical shape and exhibiting a saturation magnetization of 45 to 95 $Am^r/kg$. This patent also discloses that the ferrite raw material containing Mn and Fe is ferritized by a thermal spraying process in the ambient air, followed by rapid cooling and solidification, that particles within a predetermined range of particle size are then collected and used to produce a shaped article, and that the use of such a shaped article can lead to higher saturation magnetization and have higher dispersibility in resins, solvents or resin compositions (see claim 1, and paragraphs [0033] and in Patent Document 2).

Patent Document 3 (Japanese Unexamined Patent Application, Publication No. 2016-060682) discloses a highly spherical ferrite powder including 15 to 30 wt % ferrite particles with a particle size of less than 11 μm and having a volume average particle size of 10 to 50 μm, which powder is ferritized by a thermal spraying process after producing the adjusted granular product from the powder. This patent also discloses that the ferrite powder exhibits high filling ability, high formability, superior handling ability, and high electric resistance in the use as fillers, and that these advantages allow the shaped articles made from the resin composition composed of such spherical ferrite powder and resins to be employed in various applications including IC sealants for electromagnetic wave absorption (see claim 1, and paragraphs [0058] and [0093] in Patent Document 3).

Patent Document 4 (Japanese Unexamined Patent Application, Publication No. 2005-015303) discloses a process of producing a spherical powder, comprising the steps of: heating a mixture of a raw powder and a processing agent including at least one selected from the group consisting of higher fatty acids or their derivatives, higher hydrocarbons, and higher alcohols to a predetermined temperature to treat the surfaces of the raw powder by stirring the mixture; melting the surface-treated raw powder by supplying it into a combustible flame generated by a burner to make a spherical melted powder: and further solidifying the melted powder by moving it outside of the combustible flame to produce a spherical powder (see claim 1 in Patent Document 4).

Patent Document 1: PCT International Publication No. WO2017/212997
Patent Document 2: PCT International Publication No. WO2017/169316
Patent Document 3: Japanese Unexamined Patent Application, Publication No. 2016-060682
Patent Document 4: Japanese Unexamined Patent Application, Publication No. 2005-015303

DISCLOSURE OF THE INVENTION

Problems to be Solved by the Invention

Unfortunately, the present inventors have found through studies that ferrite powder, in some cases, may contain many irregularly shaped particles in addition to spherical particles even when produced by a thermal spraying process. The ferrite powder containing such irregularly shaped particles has a disadvantage in that magnetic properties, in particular saturation magnetization, are reduced and the filling ratio of fillers cannot be increased in resin compositions.

The present inventors have also found through further studies that ferrite powder composed of highly spherical particles including a carbon-hydrogen-oxygen (C—H—O)-containing compounds and having a limited carbon content within a specific range can reduce the content of irregularly shaped particles, resulting in prevention of decreases in saturation magnetization and filling ratio of fillers. The present inventors have further found that such ferrite powder can improve curing properties of resin when used in resin compositions.

The present invention has been completed based on these findings. An object of the invention is to provide a ferrite powder which prevents decreases in saturation magnetization and filling ratio of fillers and has superior curing properties of resin, and a process for producing such a ferrite powder.

Means for Solving the Problems

The present invention encompasses the following Aspects (1) to (5). In the present specification, the expression "- to -" includes the numerical values at both ends thereof. In other words, the term "X to Y" is synonymous with "X or more to Y or less".

Aspect (1): A ferrite powder comprising highly spherical ferrite particles,
wherein the ferrite powder contains 54.0 to 70.0 mass % iron (Fe) and 3.5 to 18.5 mass % manganese (Mn), and
wherein the ferrite powder has a volume average particle size of 2.0 to 20.0 μm and a carbon content of 0.100 mass % or less.

Aspect (2): The ferrite powder according to Aspect (1), wherein the ferrite powder has a mean shape factor SF-1 of 100 to 110.

Aspect (3): A process for producing the ferrite powder according to Aspect (1) or (2), comprising the steps of:
mixing raw materials for ferrite to prepare a raw material mixture;
preliminarily granulating the raw material mixture to form a preliminary granular product;
calcining the preliminary granular product to form a calcined product;
pulverizing the calcined product to prepare a calcined powder;
adding a lubricant in an amount of 0.5 to 13.0 mass % to and then mixing it with the calcined powder to prepare a raw material for thermal spray; and
thermally spraying the raw material for thermal spray to produce a thermally sprayed product.

Aspect (4): The process according to Aspect (3), wherein the lubricant is a compound expressed by a general formula: $CH_3—(CH_2)_m—COOH$ (where m is an integer of 10 to 16).

Aspect (5): The process according to Aspect (3) or (4), wherein the raw material for thermal spray is in the form of granules or agglomerates, and the granules or the agglomerates have larger volume average particle size than a primary particle size of the calcined powder.

Effects of the Invention

The present invention provides a ferrite powder which prevents decreases in saturation magnetization and filling ratio of fillers and has superior curing properties of resin, and a process for producing such a ferrite powder.

PREFERRED MODE FOR CARRYING OUT THE INVENTION

Specific embodiments of the present invention (hereinafter referred to as "the present embodiment") will now be described. The present invention should not be limited to the following embodiments, and various modifications can be made without changing the gist of the present invention.

Ferrite Powder

The ferrite powder according to the present embodiment is composed of highly spherical ferrite particles. In other words, the ferrite powder contains a plurality of highly spherical ferrite particles. The ferrite powder contains 54.0 to 70.0 mass % iron (Fe) and 3.5 to 18.5 mass % manganese (Mn) and has a volume average particle size of 2.0 to 20.0 In addition, the ferrite powder has a carbon content of 0.100 mass % or less.

The ferrite powder containing highly spherical ferrite particles can result in superior formability and high filling properties when used as fillers into a resin composition (or ferrite resin composite material). In other words, spherical particles effectively avoid the friction with other particles during shaping. This results in superior flowability during shaping and high filling ratio. In contrast, particles having anisotropic shapes (or irregular shapes), such as plate-like or needle-like particles, have inferior formability and low filling properties. In this specification, the term "irregularly shaped particles" encompasses particles having anisotropic shapes and are used in contrast to particles having regular shapes, such as spherical particles.

The ferrite powder according to the present embodiment contains 54.0 to 70.0 mass % iron (Fe) and 3.5 to 18.5 mass % manganese (Mn). The balance consists primarily of oxygen (O) and incidental impurities, although it may include any further component. The ferrite powder has a composition of manganese (Mn)-based ferrite. In this composition, the manganese (Mn)-based ferrite does not contain zinc (Zn) in an amount exceeding the level of incidental impurities. Accordingly, the manganese (Mn)-based ferrite is distinguished from manganese (Mn)-zinc (Zn)-based ferrite to which zinc (Zn) is intentionally added. Also in this composition, incidental impurities refer to elements that are unavoidably mixed during a manufacturing process and are included in a content of 5,000 ppm or less. The incidental impurities include silicon (Si), aluminum (Al), calcium (Ca), chlorine (Cl), boron (B), zirconium (Zr), and chromium (Cr).

The manganese (Mn)-based ferrite may have high imaginary part ($\mu''$) of the complex magnetic permeability and high tan δ at a frequency of 100 MHz in the case of significantly low iron content or significantly high manganese content. Such ferrite powder may thus lead to a decrease in saturation magnetic flux density and an increase in magnetic loss when used in resin compositions. From these viewpoints, the iron (Fe) content is limited to 54.0 mass % or more and the manganese (Mn) content is limited to 18.5 mass % or less in the present embodiment. The iron content is preferably 58.0 mass % or more, more preferably 60.0 mass % or more. The manganese content is preferably 10.0 mass % or less, more preferably 9.0 mass % or less. In contrast, the manganese (Mn)-based ferrite may have a composition of ferrite close to magnetite, which is readily oxidized, and thus cause a decrease in saturation magnetization due to oxidation in the case of significantly high iron content or significantly low manganese content. In this case, the manganese (Mn)-based ferrite also has low real part ($\mu'$) of the complex magnetic permeability at a frequency of 100 MHz. From these viewpoints, the iron (Fe) content is limited to 70.0 mass % or less and the manganese (Mn) content is limited to 3.5 mass % or more in the present embodiment. The iron content is preferably 69.0 mass % or less, more preferably 67.0 mass % or less. The manganese content is preferably 6.0 mass % or more, more preferably 7.0 mass % or more. The sum of iron and manganese contents should not exceed 73.5 mass %.

The ferrite powder according to the present embodiment has a volume average particle size (D50) of 2.0 to 20.0 If the volume average particle size is less than 2.0 the ferrite powder results in remarkably high viscosity by itself when used in resin compositions as fillers. Such ferrite powder cannot be compounded in a high filling ratio as a filler. The volume average particle size is preferably 2.5 μm or more, more preferably 3.0 μm or more. If the volume average particle size exceeds 20.0 the ferrite powder results in remarkably large magnetic loss (tan δ), thereby the resin composition produced from such powder cannot be employed in high-frequency applications. The volume average particle size is preferably 15.0 μm or less, more preferably 10.0 μm or less, further more preferably 7.0 μm or less, most preferably 5.0 μm or less.

The ferrite powder according to the present embodiment has a carbon content of 0.100 mass % or less. The carbon is a component originated from carbon-hydrogen-oxygen-containing compounds. The carbon-hydrogen-oxygen-containing compounds are mainly components derived from lubricants added during the production of ferrite powder. If the carbon-hydrogen-oxygen-containing compounds are included in the ferrite powder in a significantly high content, the ferrite powder may increase the viscosity of the resin composition before curing or preclude the curing of the resin when used in resin compositions as fillers. Although the detailed mechanism is unknown, it is speculated that the carbon-hydrogen-oxygen-containing compound derived from lubricants is a linear chain compound having no functional groups, thereby the molecules of the carbon-hydrogen-oxygen-containing compound mingle with resin molecules to raise the viscosity and have a harmful effect on the process of curing even if such a compound does not directly react with the resin. The carbon content is preferably 0.080 mass % or less, more preferably 0.060 mass % or less. The carbon content has no specific lower limit. However, significantly low content of the lubricant likely causes an increase of mixed content of irregularly shaped particles into the ferrite powder. These irregularly shaped particles result in a reduction in magnetic properties and a decrease in filling ratio. From these viewpoints, the carbon content is preferably 0.010 mass % or more, more preferably 0.015 mass % or more, further more preferably 0.030 mass % or more. A carbon content of less than 0.010 mass % is originated from some substance, other than the lubricant, adsorbed on the ferrite particles.

Ferrite particles constituting the ferrite powder preferably include a carbon-hydrogen-oxygen (C—H—O)-containing compound. Such a compound mainly contains carbon (C), hydrogen (H) and oxygen (O), and may have a composition consisting only of carbon, hydrogen and oxygen. No addition of lubricants during the production of ferrite powder causes instable feeding of raw material in the step of thermally spraying. In this condition, a large amount of raw material passes through the flame for the thermal spray and thus spherization of the material may not sufficiently proceed, resulting in the generation of irregularly shaped particles in the ferrite powder. The presence of such particles causes low magnetic properties of the ferrite powder and poor filling ratio in the resin composition. In addition, insufficient firing by the thermal spray and an increase in oxygen concentration in the sprayed frame result in low saturation magnetization. The carbon-hydrogen-oxygen-containing compound preferably have a formula expressed by $CH_3$—$(CH_2)_n$—$COOCH_3$ where n is an integer of 6 to 9, and it is more preferably methyl decanoate expressed by $CH_3$—$(CH_2)_8$-$COOCH_3$ where n is 8. It is believed that the use of lauric acid as a lubricant allows the ferrite powder to contain methyl decanoate after the thermal spray.

The ferrite powder preferably has a mean shape factor SF-1 of 100 to 110. The term "SF-1" is an index representing the sphericity of particle (or powder), SF-1 of 100 indicates a perfectly spherical shape, and SF-1 increases as the discrepancy from the spherical shape increases. SF-1 of 110 or less causes the powder to have higher flowability, and superior formability and filling ability. SF-1 may be more preferably 108 or less, further more preferably 105 or less, or most preferably 103 or less.

The mean shape factor SF-1 of the ferrite powder is given by determining the shape factor SF-1 for each of the multiple ferrite particles and then calculating the mean value. The SF-1 of each ferrite particle is given by measuring the horizontal Feret diameter R (unit: μm), projected perimeter L (unit: μm), and projected area S (unit: μm²) of each particle and substituting these measured values into the following formula (1).

[Expression 1]

$$SF-1 = \frac{R^2}{S} \times \frac{\pi}{4} \times 100 \tag{1}$$

The content of particles having an SF-1 greater than 103.6 (i.e., irregularly shaped particles) in the ferrite powder is preferably 15.0% by number or less, more preferably 10.0% by number or less, further more preferably 7.0% by number or less, particularly preferably 6.0% by number or less, most preferably 5.0 by number or less. Such a decrease in content of particles having a large SF-1 (i.e., irregularly shaped particles) results in superior formability and filling properties when the ferrite powder is used in a resin composition (or ferrite resin composite material) as a filler. The content of irregularly shaped particles does not have a specific lower limit, although it is typically 1.0% by number or more, more typically 3.0% by number or more.

Process for Producing Ferrite Powder

A process for producing the ferrite powder according to the present embodiment comprises the following steps: mixing raw materials for ferrite to prepare a raw material mixture (step of mixing raw materials); preliminarily granulating the raw material mixture to prepare a preliminary granular product (step of preliminary granulation); calcining the preliminary granular product to form a calcined product (step of calcination); pulverizing the calcined product to prepare a calcined powder (step of pulverization); adding a lubricant in an amount of 0.5 to 13.0 mass % to and then mixing it with the calcined powder to prepare a raw material for thermal spray (step of pretreatment); and thermally spraying the raw material for thermal spray to produce a thermally sprayed product (step of thermally spraying). The details of each step will now be described.

<Step of Mixing Raw Materials>

The raw materials for ferrite are mixed to prepare a raw material mixture. Known raw materials, such as oxides, carbonates, hydroxides and/or chlorides, for ferrite may be used as raw materials. For example, the raw materials for iron and manganese include iron oxide ($Fe_2O_3$), trimanganese tetraoxide ($Mn_3O_4$), manganese dioxide ($MnO_2$), and/or manganese carbonate ($MnCO_3$). The mixing proportion of the raw materials should be determined such that a ferrite powder having a desired composition can be achieved. Mixing of the raw materials may be performed with a known mixer in a dry and/or wet state.

<Step of Preliminary Granulation>

The resultant raw material mixture is preliminarily granulated to prepare a preliminary granular product. The employment of preliminary granulation enables the raw materials to be stably and continuously fed in the step of calcination described below. This is because the preliminary granular product has larger size than the raw materials and has superior flowability. In the preliminary granulation, a wet granulator such as a spray dryer can be used to granulate the raw material mixture which is in the form of slurry, or a dry granulator such as a roller compactor can be used to granulate the raw material mixture which is in the form of powder. A preliminary granular product having high sphericity and superior flowability can be prepared in this step.

<Step of Calcination>

The resulting preliminary granular product is calcined to form a calcined product. This step facilitates the ferritization of the raw material mixture. The calcination temperature may be 600 to 1300° C. The atmospheric oxygen level may be adjusted between 0 and 21 vol % to facilitate the ferritization. The calcination can be performed in a furnace, such as a static electric furnace or a rotary kiln.

<Step of Pulverization>

The resulting calcined product is pulverized to prepare calcined powder. The pulverization may be performed with any known pulverizer in a dry and/or wet state. The pulverization may be carried out with a media mill, such as a bead mill or a rod mill. Usable media are stainless steel balls, alumina balls, zirconia balls and/or steel balls. The size of media may be selected according to coarse or fine pulverization to yield pulverized particles with a desired particle size.

<Step of Full-Fledged Granulation>

A step of granulating the calcined powder (or step of full-fledged granulation) may be employed as needed. A granular product of the calcined powder can be given through this step. In the full-fledged granulation, the resulting calcined powder is dispersed into water to make slurry, and the slurry may be then granulated with a spray dryer. The granular product has larger size than the primary particle size of the calcined powder and has superior flowability. The stability of supply of raw material can be thus improved during the step of thermally spraying described below.

<Step of Pretreatment>

A lubricant is added to and mixed with the resulting calcined powder or granular product of the powder in an amount of 0.5 to 13.0 mass % to prepare a raw material for thermal spray. The addition of a predetermined amount of lubricant improves the flowability of the raw material for thermal spray. A significantly large amount of lubricant to be added does not provide any advantage in terms of an improvement in flowability. On the contrary, the curing of the resin is more likely to be precluded if the ferrite powder is used in a resin composition as a filler. This is due to a significantly high carbon content in the ferrite powder. The amount of lubricant to be added is preferably 10.0 mass % or less, more preferably 5.0 mass % or less. In contrast, no addition of lubricant or a significantly small amount of lubricant results in poor flowability of the raw material for thermal spray. In the step of thermally spraying described below, the raw material for thermal spray (or calcined powder) is fed into a device in an instable amount over time. Consequently, an excess amount of raw material is thermally sprayed, and the particles generated are not always highly spherical. Such particles, which are not highly spherical, have an irregular shape and the reaction for ferritization does not sufficiently propagate to the inside of the particles. Accordingly, the resultant ferrite powder contains many irregularly shaped particles, resulting in low magnetic properties, in particular low saturation magnetization. The amount of lubricant to be added is preferably 1.0 mass % or more, more preferably 1.5 mass % or more.

The mixing of the calcined powder or granular product with the lubricant may be performed with a known mixer, such as a Henschel mixer. The lubricant is preferably a compound having a general formula expressed by $CH_3-(CH_2)_m-COOH$ (where m is an integer of 10 to 16), more preferably lauric acid $(CH_3-(CH_2)_{10}-COOH)$ (where m=10 in the formula) and/or stearic acid $(CH_3-(CH_2)_{16}-COOH)$ (where m=16 in the formula). Such compounds are selected because they have superior effects on an improvement in flowability of the raw material for thermal spray and are available at low costs. The raw material for thermal spray is granules of calcined powder containing a lubricant if the step of full-fledged granulation is employed, or the raw material for thermal spray is agglomerates of calcined powder containing a lubricant if the step of full-fledged granulation is not employed. The volume average particle size of the raw material for thermal spray (the granules or the agglomerate) is larger than the primary particle size of the calcined powder. The raw material for thermal spray therefore has higher flowability in the subsequent step of thermally spraying.

<Step of Thermally Spraying>

The raw material for thermal spray is thermally sprayed to produce a thermally sprayed product. In the thermal spray, a mixed gas of combustible gas and oxygen (i.e., total oxygen) can be used as a gas source for combustible flame. The volume ratio of the combustible gas to oxygen (i.e., total oxygen) is preferably 1:3.5 to 1:10.0, more preferably 1:5 to 1:8.0. Such a volume ratio allows the ready formation of particles having high sphericity. The combustible gas includes flammable gas, such as propane gas, propylene gas, and acetylene gas. In particular, the propane gas can be suitably used. The feed rate of the raw material for thermal spray is preferably 3.5 to 20 kg/hour, more preferably 4.5 to 9 kg/hour. If the feed rate is remarkably large, the raw material for thermal spray tends to readily adhere to each other and the reaction of ferritization barely propagates to the inside of the particles. If the feed rate is remarkably small, the production costs increase.

Oxygen employed in the thermal spray is also used for the purpose of transportation of the raw material to the flame in the thermal spray. The oxygen therefore functions as a combustible oxygen component directly used in the flame and a transport oxygen component used for supply of raw material and then burned after the transportation of the raw material to the central part of the thermally spraying region. The carbon content in the ferrite powder after the thermal spray can be controlled by the volume ratio of the combustible oxygen component to the transport oxygen component for supply of raw material. The total oxygen consists of the combustible oxygen component and the transport oxygen component for supply of raw material, and the volume ratio of the combustible oxygen component to the transport oxygen component for supply of raw material, i.e., (combustible oxygen component) : (transport oxygen component) is preferably 95:5 to 80:20. A larger proportion (i.e., closer to 100) exceeding the above value of combustible oxygen component results in a decrease in supply capacity of raw material, thereby the raw material may clog a supply pipe for raw material. A smaller proportion (i.e., less than 80) below the above value of combustible oxygen component results in the expansive supply of raw material to the outside of the central zone of the flame having the highest temperature, thereby the carbon compound (i.e., lubricant) accompanying with the raw material tends to incompletely burn, and the carbon content included in the ferrite powder may be increased after the thermal spray. From the viewpoint of reducing the carbon content, the volume ratio of the combustible oxygen component to the transport oxygen component for supply of raw material is more preferably 95:5 to 85:15, further more preferably 95:5 to 87:13, most preferably 95:5 to 89:11.

Furthermore, the capacity of the combustible oxygen preferably has 0.85 times or more that required for complete combustion of the combustible gas. For example, in the use of propane gas as the combustible gas, the capacity of the combustible oxygen preferably has 4.25 times or more that of the propane gas. Such capacities of the combustible oxygen cause a drop in temperature of the flame of the thermal spray to be minimized even if more oxygen is supplied than the oxygen required for the combustible gas to completely burn, resulting in the prevention of incomplete combustion of the carbon compound (i.e., lubricant) accompanying with the raw material (i.e., calcined powder).

A rate of the combustible gas is preferably 1.05 to 2.00. The term "rate of the combustible gas" indicates the rate of the volume of the net combustible gas ($Nm^3$/hour) used for combustion to the weight of supplied raw material (kg/hour), which is calculated in accordance with the following formula (2):

[Expression 2]

$$\text{(Rate of combustible gas)} = \frac{\left[\text{Volume of net combustible gas used for combustion} \left(\frac{Nm^3}{\text{hour}}\right)\right]}{\left[\text{Weight of supplied raw material} \left(\frac{\text{kg}}{\text{hour}}\right)\right]} \quad (2)$$

The volume of the net combustible gas ($Nm^3$/hour) used for combustion is calculated in accordance with the following formula (3) or the following formula (4):

[Expression 3]

(Volume of net combustible gas for combustion)=
(Volume of supplied oxygen)/5           (3)

[where (volume of supplied combustible gas)×5−(volume of supplied oxygen)≥0]

[Expression 4]

(Volume of net combustible gas for combustion)=
(Volume of supplied combustible gas)           (4)

[where (volume of supplied combustible gas)×5−(volume of supplied oxygen)<0]

Examples of the transport gas for transporting the raw material for thermal spray into the combustible gas include nitrogen, oxygen, and air. The flow rate of the raw material for thermal spray to be transported is preferably 20 to 60 m/sec. The step of thermally spraying is carried out at a temperature of preferably 1000 to 3500° C., more preferably 2000 to 3500° C. Particles ferritized by the thermal spray are rapidly cooled and then solidified in the ambient air, and the particles are recovered with a cyclone or a filter to yield a thermally sprayed product.

<Step of Classification>

The resultant thermally sprayed product may be classified as needed. In the classification, the particle size may be adjusted to a desired particle size by a known process, such as wind power classification (or airflow classification), mesh classification, and sieving classification. In addition, particles having a large particle size and particles having a small particle size may be separated and then recovered in one step by airflow classification such as a cyclone. The ferrite powder that irregularly shaped particles are prevented to be contained can be prepared in such a procedure.

The present embodiment provides a ferrite powder having superior curing properties of resin while preventing a decrease in saturation magnetization and a decrease in filling ratio of fillers, and a process for producing the ferrite powder. Such a ferrite powder has a low content of irregularly shaped particles, and thereby can prevent disadvantages, such as a decrease in saturation magnetization and a decrease in filling ratio of fillers. In addition, such a ferrite powder has a carbon content within a specific range, leading to an advantage in having superior curing properties of resin.

To the best of the present inventors' knowledge, such a ferrite powder has not been recognized up to the present. Although Patent Documents 1 to 3 disclose highly spherical ferrite particles produced by a thermal spraying process, they do not disclose information on the carbon content. Although Patent Document 4 discloses a process for producing a ferrite powder, comprising the step of treating the raw powder with a surface processing agent such as a higher fatty acid, it does not also describe the carbon content in the resulting powder and curing properties of resin. In addition, the process disclosed in Patent Document 4 includes no step of granulation of raw powder, thereby it is believed that such raw powder has inferior flowability during the production of ferrite powder.

Ferrite Resin Composite Material

The ferrite powder according to the present embodiment can be used in a ferrite resin composite material (or resin composition). The ferrite resin composite material includes ferrite powder and resins. The use of the ferrite powder according to the present embodiment can achieve a composite material having high filling ratios of fillers, superior magnetic properties (such as high saturation magnetic flux density and low magnetic loss), and superior curing properties of resin.

Examples of the resins constituting the composite material include epoxy resins, urethane resins, acrylic resins, silicone resins, polyamide resins, polyimide resins, polyamide-imide resins, fluororesins, or combinations thereof. The silicone resins may be modified silicone resins modified with, for example, acrylic, urethane, epoxy and/or fluorine groups.

The proportion of the ferrite powder to the total solid content in the composite material is preferably 50 to 95 mass %, more preferably 80 to 95 mass %. The proportion of the resin to the total solid content in the composite material is preferably 5 to 50 mass %, more preferably 5 to 20 mass %. The above proportional range of the ferrite powder or the resin can result in superior dispersibility of the ferrite powder in the composite material, and high storage stability and formability of the composite material, thereby the composite articles (i.e., shaped articles) given through shaping the composite material have superior characteristics, such as mechanical strength and electromagnetic shielding properties.

The composite material may contain other components than ferrite powder and resins. Examples of such components include solvents, fillers (e.g., organic fillers or inorganic fillers), plasticizers, antioxidants, dispersants, colorants such as pigments, and thermally conductive particles.

Such a ferrite resin composite material can be applied to electromagnetic shielding materials, electronic materials or electronic components. The electromagnetic shielding materials, the electronic materials or the electronic components may be produced by shaping composite materials using known processes. Any process of shaping can be used, such as compression molding, extrusion molding, injection molding, blow molding, or calender molding. In addition, the process may include a procedure of forming a coating film of the composite material on a substrate.

EXAMPLES

The present invention will now be described in more detail with reference to the following Examples. However, the present invention should not be limited to the following Examples.

(1) Production of Ferrite Powder

Example 1

<Steps of Mixing of Raw Materials and Preliminary Granulation>

Iron oxide ($Fe_2O_3$) and trimanganese tetraoxide ($Mn_3O_4$) as raw materials that were weighed into a molar ratio of iron (Fe) to manganese (Mn), i.e., Fe:Mn, of 8:1 were mixed. Water was added to the mixture, and the mixture was pulverized with a wet bead mill to prepare slurry having a solid content of 50 mass %. The slurry was then granulated with a spray dryer to produce a preliminary granular product.

<Steps of Calcination and Pulverization>

The resultant preliminary granular product was calcined to form a calcined product. The calcination was performed in a rotary kiln at a temperature of 780° C. in the ambient air. The resultant calcined product was then pulverized with a dry bead mill to prepare a calcined powder. The calcined powder had a particle size (i.e., primary particle size) of 4.2 µm.

<Step of Full-Fledged Granulation>

Water was added to the resultant powder, and the powder was pulverized with a wet bead mill to prepare a slurry having a solid content of 50 mass %. The particle size (i.e., primary particle size) of the pulverized powder in the slurry was 4.2 µm. The slurry was then granulated with a spray dryer. The resulting granular product (i.e., granular product of calcined powder) had an average particle size of 50 µm.

<Step of Pretreatment>

Lauric acid as a lubricant was added to and mixed with the resulting granular product in a Henschel mixer. In the mixing, the amount of lubricant (i.e., lauric acid) was 15.0 parts by mass for 100.0 parts by mass of granular product (corresponding to 15.0 mass % of the granular product). A raw material for thermal spray was thereby yielded.

<Step of Thermally Spraying>

The lubricant-containing granular product (i.e., raw material for thermal spray) was thermally sprayed in the flame of combustible gas and then rapidly cooled. In the thermal spray, the flow rate of propane gas to the flow rate of total oxygen had a ratio of 1:5.42, and the feed rate of raw material was 1.13 in terms of a rate of the combustible gas. The cooled particles were subsequently recovered with a cyclone disposed downstream of the gas flow to yield a thermally sprayed product. In the thermal spray, the ratio of the combustible oxygen component to the transport oxygen component for supply of raw material, i.e., (combustible oxygen component) : (transport oxygen component), was 89.5:10.5.

<Step of Classification>

Coarse powder was removed through a sieve and fine powder was then removed by airflow classification from the thermally sprayed product to produce a ferrite powder composed of ferrite particles. The conditions of producing the ferrite powders are described in Table 1.

Example 2

A ferrite powder was produced as in Example 1 except that the additive amount of lubricant (i.e., lauric acid) was 5.0 parts by mass for 100.0 parts by mass of the granular product (corresponding to 5.0 mass % of the granular product) in the step of pretreatment.

Example 3

A ferrite powder was produced as in Example 1 except that the additive amount of lubricant (i.e., lauric acid) was 3.0 parts by mass for 100.0 parts by mass of the granular product (corresponding to 3.0 mass % of the granular product) in the step of pretreatment.

Example 4

A ferrite powder was produced as in Example 1 except that the additive amount of lubricant (i.e., lauric acid) was 1.5 parts by mass for 100.0 parts by mass of the granular product (corresponding to 1.5 mass % of the granular product) in the step of pretreatment.

Example 5

A ferrite powder was produced as in Example 1 except that the lubricant (i.e., lauric acid) was not added.

Example 6

A ferrite powder was produced as in Example 4 except that iron oxide and trimanganese tetraoxide were weighed into a molar ratio of iron (Fe) to manganese (Mn), i.e., Fe:Mn, of 3:1 and were then mixed in the steps of mixing and pulverization. In the step of full-fledged granulation, the particle size (i.e., primary particle size) of the pulverized powder in the slurry was 4.7 µm.

Example 7

A ferrite powder was produced as in Example 4 except that iron oxide and trimanganese tetraoxide were weighed into a molar ratio of iron (Fe) to manganese (Mn) of 14:1 and were then mixed in the steps of mixing and pulverization. In the step of full-fledged granulation, the particle size (i.e., primary particle size) of the pulverized powder in the slurry was 3.9 um.

Example 8

A ferrite powder was produced as in Example 4 except that the conditions for classification were changed in the step of classification. In the step of full-fledged granulation, the particle size (i.e., primary particle size) of the pulverized powder in the slurry was 4.2 um.

Example 9

A ferrite powder was produced as in Example 4 except that the conditions for classification were changed in the step of classification. In the step of full-fledged granulation, the particle size (i.e., primary particle size) of the pulverized powder in the slurry was 4.2

(2) Evaluation of Ferrite Powder

The ferrite powders of Examples 1 to 9 were evaluated as described below.

<Chemical analysis (ICP)>

The contents of metal elements in the ferrite powder were determined as follows. A ferrite powder sample (0.2 g) was weighed, pure water (60 ml), IN hydrochloric acid (20 ml) and IN nitric acid (20 ml) were added to the sample, and the mixture was then heated until the sample was completely dissolved in an aqueous solution. The aqueous solution was placed in an ICP analyzer (Shimadzu Corporation, ICPS-10001V) to measure the contents of metal elements.

<Carbon Content>

The carbon content in the ferrite powder was measured by infrared absorption spectrometry. In detail, 1 g of ferrite powder was burned in an oxygen flow to convert the carbon contained in the ferrite powder into carbon dioxide. The infrared absorbance of carbon dioxide was measured with an infrared absorption detector (LECO Japan Corporation, Sulfur and Carbon Analyzer CS200), and the carbon content was calculated from the measured absorbance.

<Analysis of residual carbon-containing compound (GC/MS)>

The carbon-containing compound remaining in the ferrite powder was analyzed with a high-resolution mass spectrometer (GC/MS). In detail, 5 g of ferrite powder was weighed and placed in a beaker having an internal volume of 200 ml, and 500 ml of methyl ethyl ketone (MEK) was further placed, followed by ultrasonic treatment for five minutes to extract organic components accompanying with the ferrite powder. The extract-containing MEK solution was filtered, and the resulting filtrate was used as liquid for testing. Analytical conditions for the high-resolution mass spectrometer (GC/MS) are shown as follows:

Gas Chromatograph: Agilent Technologies Inc., 6890N
Mass spectrometer: Agilent Technologies Inc., 5973N
Column: Agilent Technologies Inc., DB-5MS (film thickness; 0.25 µm)
Thermal desorber: Perkin Elmer Inc., TurboMatrix 650ATD
Thermal profile: 50° C. (two minutes) to 280° C. (18 minutes)
Heating rate: 20° C/min
Flow rate of carrier gas: helium, 1 ml/min
Injection mode: splitless, 0.5 minutes
Temperature at inlet: 280° C.
Temperature at interface: 280° C.
Measured mass range: m/z 29-600
Injection volume: 1 µl The carbon-containing compound was identified as follows:

With an analyzer (Agilent Technologies Inc., 5973N), Detection peaks derived from the device and MEK were eliminated on a TIC chromatogram, and a library search was performed for each of the remaining detected peaks. The compound having the highest matching level in a library search of the mass spectral pattern was identified as the residual carbon-containing compound in the ferrite powder.

<Particle Size Distribution>

The particle size distribution of the ferrite powder was measured. Into a 100-ml beaker was placed 10 g sample and 80 ml water, and two drops of sodium hexametaphosphate was added as a dispersant. The mixture was then dispersed with an ultrasonic homogenizer (SMT Co., Ltd., UH-150). The dispersion was performed for 20 seconds at an output level of 4 of the ultrasonic homogenizer. The bubbles formed on the surface of beaker were then removed and the dispersion was introduced into a laser diffraction particle size distribution analyzer (Shimadzu Corporation, SALD-7500 nano) for measurement. In this measurement, 10% diameter (D10), 50% diameter (volume average particle size, D50), and 90% diameter (D90) were determined from the volume particle size distribution. The measuring conditions included a pump rate of 7, a built-in ultrasonic irradiation time of 30, and a refractive index of 1.70-050i.

<BET Specific Surface Area>

The BET specific surface area of the ferrite powder was measured with a specific surface area analyzer (Mountech Co., Ltd., Macsorb HM model-1208). Approximately 10 g of the resulting ferrite powder was placed on medicine wrapping paper and degassed with a vacuum dryer until the degree of vacuum reached −0.1 MPa or less. The powder was then heated at 200° C. for two hours to remove the water adsorbed on the particle surface. Approximately 0.5 to 4 g of the ferrite powder after removing water was placed in a standard sample cell dedicated to the analyzer and correctly weighed with a precision balance. The weighed ferrite particles were subsequently placed in the sample port of the analyzer and then measured. The measurement was carried out by a one-point method. The atmosphere for measurement includes a temperature of 10 to 30° C. and a relative humidity of 20 to 80% (without dewing).

<Tap Density>

The tap density of the ferrite powder was measured in accordance with JIS Z 2512-2012 with a USP tap density analyzer (Hosokawa Micron Corporation, Powder Tester PT-X).

<Shape Factor (SF-1)>

The mean shape factor (SF-1) of the ferrite powder was determined as follows: Ferrite powder was analyzed using a particle image analyzer (Malvern Panalytical Ltd., Morphologi G3). Image analysis was carried out for all the 30,000 particles in the powder, and the maximum length (i.e., horizontal Feret diameter) R (unit: µm), projected perimeter L (unit: µm), and projected area S (unit: µm$^2$) were automatically measured. SF-1 for each particle was then calculated in accordance with the following formula (1), and the mean value thereof was used as SF-1 of the ferrite powder.

[Expression 5]

$$SF - 1 = \frac{R^2}{S} \times \frac{\pi}{4} \times 100 \tag{1}$$

In addition, the number of particles having SF-1 larger than 103.6 (i.e., irregularly shaped particles) was counted, and the ratio of irregularly shaped particles was determined in accordance with the following formula (5).

[Expression 6] (5)

$$\text{(Ratio of irregularly shaped particles)} = \frac{\text{(Number of irregularly shaped particles)}}{\text{(Number of all analyzed particles)}} \times 100$$

<Magnetic Properties (such as Saturation Magnetization, Remanent Magnetization, and Coercivity)>

The magnetic properties (such as saturation magnetization, remanent magnetization, and coercivity) of the ferrite powder were measured as follows: A sample was packed in a cell having an inner diameter of 5 mm and a height of 2 mm, and placed in a vibrating sample magnetometer (Toei Industry Co., Ltd., VSM-C7-10A). A magnetic field was applied and swept up to 5 kOe, and the applied magnetic field was then reduced to draw a hysteresis curve. From the data in this curve, the saturation magnetization σs, the remanent magnetization σr, and the coercivity Hc of the sample were determined.

<Magnetic Permeability>

The permeability of the ferrite powder was measured with an RF impedance/material analyzer (Agilent Technologies Inc., E4991A) and a magnetic material measuring electrode (16454A). Into a polyethylene container (content capacity: 100 ml) was placed 9 g of the ferrite powder and 1 g of a binder resin (Kynar301F: polyvinylidene difluoride), and the mixture was stirred with a ball mill under conditions including a rotation rate of 100 rpm. The resultant mixture (about 0.6 g) was transferred into a die (inner diameter: 4.5 mm, outer diameter: 13 mm) and pressed at a pressure of 401V1Pa for one minute with a pressing machine to yield a shaped article. The resultant shaped article was heat-cured at 140° C. for two hours with a hot air dryer to prepare a sample for measurement. The resultant sample was placed in the RF impedance/material analyzer, and the outer diameter, inner diameter and height of the sample preliminarily measured were input. In the measurement, the amplitude was set to 100 mV, the frequency range of 1 MHz to 3 GHz was swept on a logarithmic scale, the real part (μ') and the imaginary part (,f) of the complex magnetic permeability at a frequency of 100 MHz were determined, and the loss factor (tan δ) was calculated in accordance with the following formula (6):

[Expression 7]

$$\tan \delta = \frac{\mu''}{\mu'} \quad (6)$$

<Curing Properties of Resin>

The ferrite powder was used in a resin composition, and the curing properties of the resin composition was evaluated. Ferrite powder (80 parts by mass), epoxy resin (18 parts by mass) and a curing agent (2 parts by mass) were thoroughly dispersed in a planetary centrifugal mixer to prepare a resin composition. The resultant resin composition was dried under conditions of 120° C. for five minutes. The dried resin composition was heated at 180° C. to promote curing, and the curing time was determined at which the degree of curing of the resin was 95% or more. The curing properties of resin were ranked based on the resulting curing time as follows.

A: Curing time is std×1.00 or more to less than std×2.00
B: Curing time is std×2.00 or more to less than std×3.00
C: Curing time is std×3.00 or more In this ranking, the degree of curing of the resin indicates the degree in progress of the curing reaction (i.e., reaction rate) of the resin. The degree of curing of resin is 0% in an unreacted material while the degree of curing of resin is 100% in a reacted material. The degree of curing of resin was determined by FT-IR (Fourier-transform infrared spectroscopy) device. Specifically, the resin was irradiated with infrared rays to give an FT-IR spectrum by transmission and diffraction, and the progress in curing reaction of the resin was determined from this spectrum. The spectra of the unreacted material and the completely (100%) reacted material were compared with the spectrum of the target resin, and the peak intensity of each sample in the region where the largest difference was observed was compared to determine the degree of curing of the resin. The curing time of each sample was then calculated based on the curing time of the ferrite powder of Example 4 as a standard (or std).

The resin composition may be dried under any condition other than the conditions described above, and the resin composition may be dried until the content of the organic solvent in the resin composition is preferably 10 mass % or less, more preferably 5 mass % or less. Suitable conditions for drying can be appropriately determined through a simple experiment. The conditions depend on the amount of organic solvent in a varnish (i.e., resin composition), for example, a varnish containing 30 to 60 mass % of organic solvent can be dried at 50 to 150° C. for about three to ten minutes. In addition, the degree of curing of resin can be measured with a FT-IR device, or may be measured with any device, such as a dispersive infrared spectrophotometer.

(3) Results

The results of evaluation for Examples 1 to 9 are described in Tables 1 and 2. As shown in Tables 1 and 2, ferrite powders in Examples 1 to 9 each include a manganese ferrite composition and has a volume average particle size (D50) of 2.6 to 7.5 μm. These ferrite powders contained highly spherical particles.

The samples in Examples 2 to 4 and Examples 6 to 9, each containing a lubricant (i.e., lauric acid) in an amount of 1.5 to 5.0 mass %, included methyl decanoate, which was a carbon-hydrogen-oxygen-containing compound, and had a carbon content of 0.012 to 0.080 mass %. In these samples, the content of irregularly shaped particles (i.e., the content of particles having SF-1 larger than 103.6) was as small as 6.2% by number or less, thereby such samples had no disadvantage in terms of magnetic properties and magnetic permeability. Furthermore, such samples also had no disadvantage in terms of curing properties of resin when used in a resin composition. In particular, the samples in Example 3, 4, 6, 7 and 9, each having a carbon content of 0.012 to 0.060 mass %, had high curing properties of resin. The sample in Example 5 containing no lubricant also had high curing properties of resin. Although the lubricant was not added to the sample in Example 5 at the time of production, the sample contained a very small amount (0.002 mass %) of carbon. It is speculated that such carbon may be derived from soot in the step of thermally spraying, although the detailed mechanism is unknown.

In contrast, the sample in Example 1 where the lubricant was added in an amount of 15.0 mass % had a very large carbon content (0.200 mass %). This sample exhibited too long curing time of resin when used in a resin composition and had a disadvantage in terms of curing properties of resin.

TABLE 1

Conditions of production and results of evaluation for ferrite powders

| | Mixing and pulverization of raw materials | | | Lubricant | Chemical analysis | | Carbon content | Residual carbon-containing compound |
|---|---|---|---|---|---|---|---|---|
| | Fe (mol) | Mn (mol) | Particle size after pulverization (μm) | Content of lubricant (mass %) | Fe (mass %) | Mn (mass %) | C (mass %) | C—H—O-containing compound (Methyl decanoate) |
| Example 1* | 8 | 1 | 4.2 | 15 | 64.5 | 7.8 | 0.200 | Found |
| Example 2 | 8 | 1 | 4.2 | 5 | 64.3 | 7.9 | 0.080 | |
| Example 3 | 8 | 1 | 4.2 | 3 | 64.6 | 7.8 | 0.060 | |
| Example 4 | 8 | 1 | 4.2 | 1.5 | 64.4 | 7.9 | 0.030 | |
| Example 5 | 8 | 1 | 4.2 | — | 64.3 | 7.8 | 0.002 | Not found |
| Example 6 | 3 | 1 | 4.7 | 1.5 | 54.3 | 17.9 | 0.020 | Found |
| Example 7 | 14 | 1 | 3.9 | 1.5 | 67.6 | 4.6 | 0.030 | |
| Example 8 | 8 | 1 | 4.2 | 1.5 | 64.5 | 7.8 | 0.080 | |
| Example 9 | 8 | 1 | 4.2 | 1.5 | 64.6 | 7.7 | 0.012 | |

Note 1)
*indicates comparative example.
Note 2)
[—] indicates no content.

TABLE 2

Results of evaluation for ferrite powders

| | Properties of powder | | | | | Ratio of irregularly shaped particles (% by number) | Magnetic properties (VSM, 5 kOe) | | | Permeability (100 MHz) | | | Curing properties of resin | |
|---|---|---|---|---|---|---|---|---|---|---|---|---|---|---|
| | D50 (μm) | BET (m²/g) | Tap density (g/cm³) | Shape of particle | SF-1 | | σs (emu/g) | σr (emu/g) | Hc (Oe) | μ' | μ'' | tanδ | Curing time | Rank |
| Example 1* | 3.9 | 0.72 | 2.86 | Highly spherical | 101 | 5.3 | 82.1 | 3.0 | 39.8 | 5.73 | 0.26 | 0.05 | Std × 4.80 | C |
| Example 2 | 3.6 | 0.70 | 2.83 | Highly spherical | 101 | 6.2 | 81.7 | 2.9 | 40.3 | 6.12 | 0.29 | 0.05 | Std × 2.30 | B |
| Example 3 | 3.7 | 0.68 | 2.79 | Highly spherical | 102 | 5.7 | 81.0 | 3.1 | 42.0 | 5.87 | 0.25 | 0.04 | Std × 1.20 | A |
| Example 4 | 3.3 | 0.63 | 2.75 | Highly spherical | 102 | 6.1 | 80.6 | 2.9 | 41.2 | 5.81 | 0.07 | 0.01 | Std × 1.00 | A |
| Example 5 | 3.5 | 0.78 | 2.19 | Highly spherical and irregular | 111 | 10.5 | 69.1 | 4.3 | 50.3 | 5.24 | 0.08 | 0.01 | Std × 1.10 | A |
| Example 6 | 3.6 | 0.59 | 2.88 | Highly spherical | 101 | 4.8 | 77.1 | 3.6 | 58.2 | 8.06 | 1.06 | 0.13 | Std × 1.05 | A |
| Example 7 | 3.4 | 0.62 | 2.71 | Highly spherical | 101 | 5.1 | 69.8 | 5.6 | 54.8 | 4.97 | 0.15 | 0.03 | Std × 1.10 | A |
| Example 8 | 2.6 | 0.83 | 2.51 | Highly spherical | 103 | 3.3 | 76.8 | 4.5 | 36.7 | 6.29 | 0.18 | 0.03 | Std × 2.40 | B |
| Example 9 | 7.5 | 0.33 | 3.09 | Highly spherical | 101 | 4.5 | 85.3 | 1.9 | 35.2 | 8.67 | 1.46 | 0.17 | Std × 1.10 | A |

Note 1)
*indicates comparative example.

The invention claimed is:

1. A ferrite powder comprising highly spherical ferrite particles,
wherein the ferrite powder contains 54.0 to 70.0 mass % iron (Fe) and 3.5 to 10 mass % manganese (Mn),
wherein the ferrite powder has a volume average particle size of 2.5 to 20.0 μm and a carbon content of from 0.010 mass % to 0.100 mass %, and
wherein the ferrite powder has a mean shape factor SF-1 of 100 to 110.

2. The ferrite powder according to claim 1, wherein the ferrite powder comprises a carbon-hydrogen-oxygen (C—H—O)-containing compound.

3. The ferrite powder according to claim 2, wherein the carbon-hydrogen-oxygen-containing compound has a formula $CH_3$—$(CH_2)_n$—$COOCH_3$ where n is an integer of 6 to 9.

4. The ferrite powder according to claim 1, wherein the ferrite powder comprises 58.0 to 70.0 mass % iron (Fe).

5. The ferrite powder according to claim 1, wherein the ferrite powder has a volume average particle size of 2.5 to 7.0 μm.

6. A process for producing the ferrite powder according to claim 1, comprising the steps of:
mixing raw materials for ferrite to prepare a raw material mixture;

preliminarily granulating the raw material mixture to form a preliminary granular product;

calcining the preliminary granular product to form a calcined product;

pulverizing the calcined product to prepare a calcined powder;

adding a lubricant in an amount of 0.5 to 13.0 mass % to and then mixing it with the calcined powder to prepare a raw material for thermal spray; and thermally spraying the raw material for thermal spray to produce a thermally sprayed product.

7. The process according to claim 6, wherein the lubricant is a compound expressed by a general formula: $CH_3-(CH_2)_m-COOH$, where m is an integer of 10 to 16.

8. The process according to claim 6, wherein the raw material for thermal spray is in the form of granules or agglomerates, and the granules or the agglomerates have larger volume average particle size than a primary particle size of the calcined powder.

* * * * *